(12) United States Patent
Heideman

(10) Patent No.: US 6,353,797 B1
(45) Date of Patent: Mar. 5, 2002

(54) DATABASE MINIMIZING BY WIRELESS INPUT OF LOCATION RELATED INFORMATION

(75) Inventor: Michael Heideman, Palo Alto, CA (US)

(73) Assignee: AirFlash, Redwood City, CA (US)

( * ) Notice: Subject to any disclaimer, the term of this patent is extended or adjusted under 35 U.S.C. 154(b) by 0 days.

(21) Appl. No.: 09/587,578

(22) Filed: Jun. 1, 2000

(51) Int. Cl.[7] .............................................. G01C 21/00
(52) U.S. Cl. .................. 701/207; 701/214; 342/357.01; 342/357.1
(58) Field of Search ................... 701/207, 208, 701/214; 340/825.06, 5.2, 825.49, 992, 996; 342/357.01, 357.06, 357.07, 357.08, 357.1, 357.13, 457; 455/456

(56) References Cited

U.S. PATENT DOCUMENTS

| | | | |
|---|---|---|---|
| 4,554,418 A | 11/1985 | Toy | 179/2 DP |
| 4,812,843 A | 3/1989 | Champion, III et al. | 340/905 |
| 4,926,336 A | 5/1990 | Yamada | 364/444 |
| 5,122,959 A | 6/1992 | Nathanson et al. | 364/436 |
| 5,359,527 A | 10/1994 | Takanabe et al. | 364/449 |
| 5,523,950 A | 6/1996 | Peterson | 364/436 |
| 5,559,520 A | 9/1996 | Barzegar et al. | 342/357 |
| 5,594,425 A * | 1/1997 | Ladner et al. | 340/825.06 |
| 5,627,547 A | 5/1997 | Ramaswamy et al. | 342/357 |
| 5,627,549 A | 5/1997 | Park | 342/357 |
| 5,729,458 A | 3/1998 | Poppen | 364/464.1 |
| 5,748,107 A | 5/1998 | Kersken et al. | 340/905 |
| 5,774,828 A | 6/1998 | Brunts et al. | 701/210 |
| 5,802,492 A | 9/1998 | DeLorme | 701/200 |
| 5,812,959 A | 9/1998 | Froeburg et al. | 701/117 |
| 5,819,201 A | 10/1998 | DeGraaf | 701/208 |
| 5,842,142 A | 11/1998 | Murray et al. | 701/16 |
| 5,845,227 A | 12/1998 | Peterson | 701/209 |
| 5,892,454 A * | 4/1999 | Schipper et al. | 340/825.37 |
| 5,893,081 A | 4/1999 | Poppen | 705/400 |
| 5,906,654 A | 5/1999 | Sato | 701/210 |
| 5,948,040 A | 9/1999 | DeLorme | 701/201 |
| 5,960,341 A * | 9/1999 | LeBlanc et al. | 455/426 |
| 6,021,406 A | 2/2000 | Kuznetsov | 707/6 |
| 6,091,956 A | 7/2000 | Hollenberg | 455/456 |

* cited by examiner

*Primary Examiner*—Yonel Beaulieu
(74) *Attorney, Agent, or Firm*—Fliesler, Dubb, Meyer & Lovejoy LLP

(57) ABSTRACT

A method, system and article of manufacture is provided to efficiently identify the location of an individual. A first area surrounding the location is obtained by triangulation or other position location methods. A set of street names in the first area is obtained from a database and presented to a user. The user then aids in identifying the present location by selecting the street name or intersection of street names which is closest to his present location.

20 Claims, 5 Drawing Sheets

DATABASE MINIMIZING BY WIRELESS INPUT OF LOCATION RELATED INFORMATION

FIELD OF THE INVENTION

The present invention relates to positioning systems, and in particular, to obtaining a users location.

BACKGROUND OF THE INVENTION

Often there is a need to determine the location of a user. For example, a user may need directions to a desired location beginning at a point where the user is currently located. This desired location may be a nearby restaurant, store, gas station or any other point of interest. In order to properly provide these directions, the location of the user must first be determined, including the street the user is on and nearby cross streets.

In addition to being able to provide travel directions to a user, other beneficial information regarding surrounding traffic information, road closures, and potential alternatives to the destination may also be provided to a user once their location is determined . Further, being able to determine a user's location will allow medical or other types of assistance to be quickly dispatched to the exact location in case of an emergency.

Current methods for determining a users location are performed using global positioning satellites, cellular triangulation, angle of arrival ("AOA"), time difference of arrival ("TDOA"), location pattern matchings, or adaptive antenna array or an equivalent. However, these current methods have several drawbacks.

First, cellular triangulation only has the ability to give an approximate location of a user. The overall size of this approximated area can vary greatly in size depending on the density of cellular towers in the area. In addition to being unable to pinpoint a user's location, if the user has missed a handoff and traveled outside a sector's normal coverage area but remained on one of its channels, a false area location may be provided completely missing the user's location.

Second, while global positioning can better determine a user's precise location compared to cellular triangulation it requires a user to carry additional receiving equipment. Further, for this system to operate the user must be in a location where at least 3 satellites can lock onto his/her transmitter to provide an accurate reading. Also, if communication is lost between the users transmitter and the satellites it can take several minutes to reconnect and receive an updated position. While this system is capable of providing a more precise user location it is often undesirable in dense areas where a user is often traveling through tunnels, under bridges, or among large buildings were satellite communication may be lost.

Therefore, it is desirable to provide a system, method, and article of manufacture for determining an individual's location. The system, method, and article of manufacture should be able to determine the street on which the user is currently located and nearby cross streets.

SUMMARY OF THE INVENTION

According to an embodiment of the present invention, a method for identifying a location of an individual is provided. The method comprises the steps of estimating a first area surrounding the location. A set of street names of a respective set of streets in the area is then obtained. A street name from the individual is requested and a street name response is received. A determination is then made of the location responsive to a match between the street name from the individual and the set of street names.

According to an embodiment of the present invention, the set of street names is one street.

According to another embodiment of the present invention, the obtaining step includes loading the set of street names into a voice recognition software program.

According to yet another embodiment of the present invention, a cross street location is identified.

According to yet another embodiment of the present invention, a computer for identifying a location of an individual is provided. The computer comprises a storage device and a processor coupled to the storage device. The storage device is for storing a plurality of street names. The storage device also stores a program for controlling the processor. The processor operates with the program to (a) obtain a first area surrounding the location; (b) obtain a set of street names of a respective set of streets in the area from the plurality of street names; (c) request a street name from the individual; (d) receive a street name from the individual; and (e) determine the location responsive to a match between the street name received from the individual and the set of street names.

According to yet another embodiment of the present invention, a system for identifying a location of an individual is provided. A first processing device obtains a first area surrounding the location. A storage device is coupled to the first processing device and stores a plurality of street names of a respective set of streets in the area. A second processing device requests a street name from the individual and receives a street name response. The first processor then determines the location responsive to a match between the street name from the individual and the set of street names.

According to yet another aspect of the present invention, an article of manufacture, including a computer readable medium is provided for identifying a location of an individual. The computer readable medium includes a first software program for obtaining a first area surrounding the location. A second software program obtains a set of street names of a respective set of streets in the area. A third software program requests a street name from the individual and receives a street name response. A fourth software program determines the location responsive to a match between the street name from the individual and the set of street names.

Other aspects and advantages of the present invention can be seen upon review of the figures, the detailed description, and the claims which follow. In the figures, like reference numerals indicate like components.

DETAILED DESCRIPTION

Figure 1:
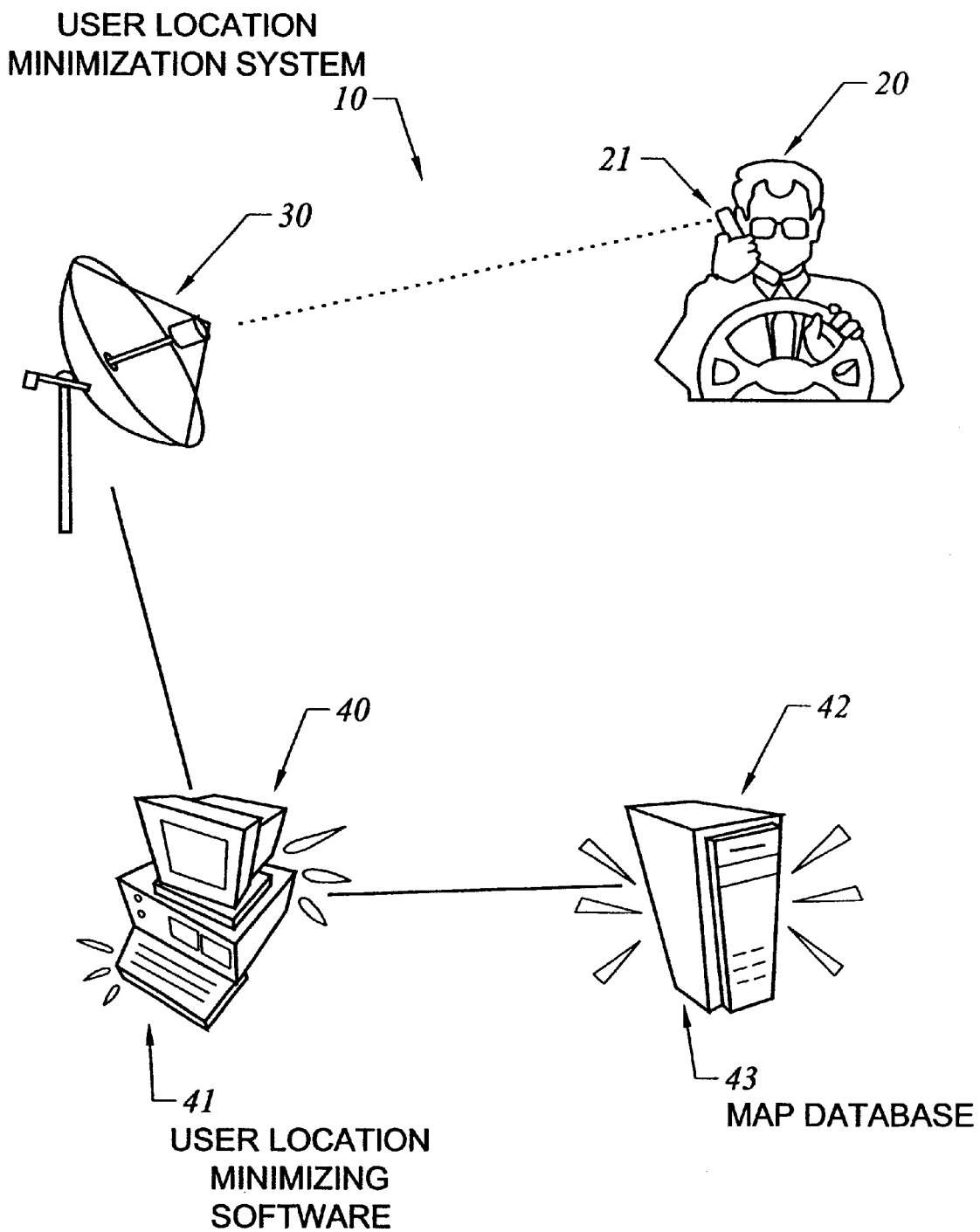
FIG. 1 illustrates a system for minimizing a users current location, according to an embodiment of the present invention.

FIG. 1 illustrates a user location minimizing system 10 for determining the location of a user, according to an embodiment of the present invention. System 10 includes a processing device, for example communication device 21. In an embodiment, communication device 21 is a wireless device such as a cellular telephone. In alternate embodiments, communications device 21 may be a personal digital assistant, computer, or equivalent thereof.

In an alternate embodiment, communication device 21 may be wired. For example, communication device 21 is a pay telephone.

A user 20 operates communication device 21 in order to select options related to determining their current position, obtain directions regarding their current location, receiving information regarding the area surrounding user's 20 location, or request assistance to be dispatched to where user 20 is currently located.

Communication transmitter/receiver 30 is used to obtain and transmit information to communication device 21. In an embodiment, communication transmitter/receiver 30 is a cellular transmitter/receiver for communicating with a cellular telephone.

Processing device 40 is wired to communication transmitter/receiver 30 in an embodiment of the present invention. In alternate embodiments, processing device 40 is connected to transmitter/receiver 30 by a wireless connection. In an embodiment, processing device 40 is a computer such as a computer server. In alternate embodiments, processing device 40 is a distributed collection of processing devices. In an embodiment, processing device 40 stores user location minimizing software 41 in processing device memory.

In an alternate embodiment, user location minimizing software 41 may be stored on a computer readable medium, including but not limited to, a hard disk, a floppy disk, an optical disk or equivalent thereof. In an embodiment, user location minimizing software is written in the C, C++, or Java™ computer languages, singly or in combination therewith.

Figure 4A:
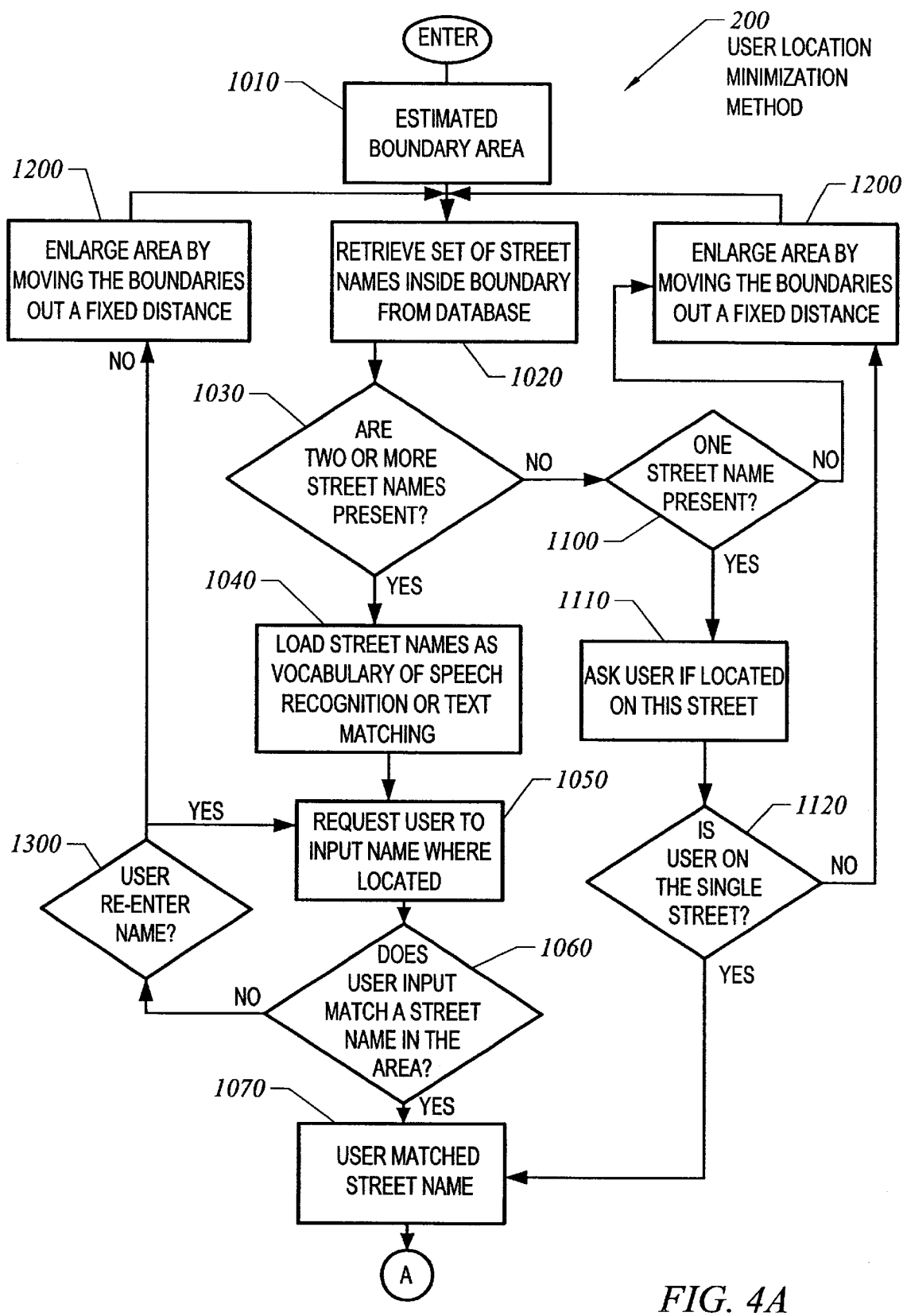
Figure 4B:
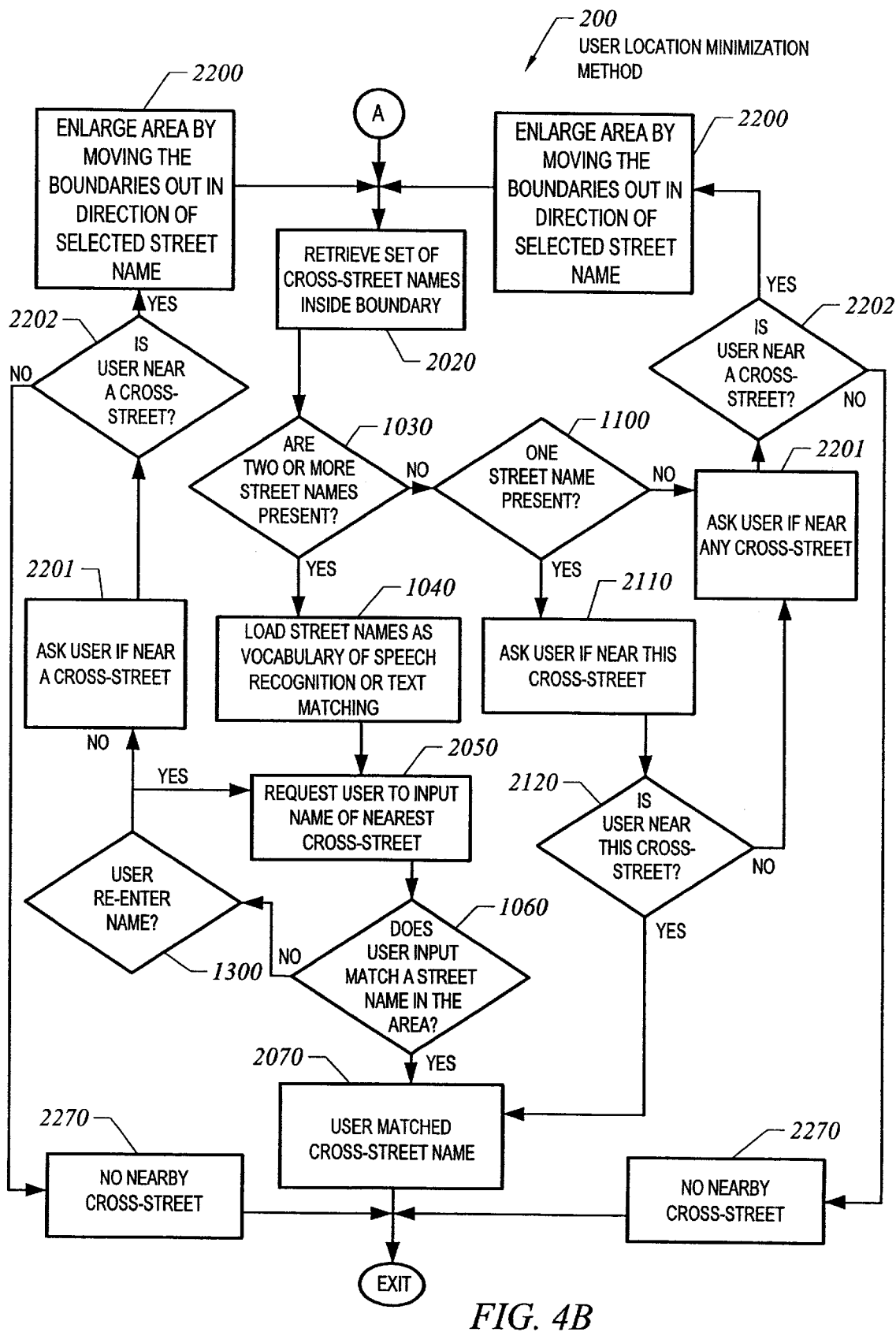

FIGS. 4A and 4B illustrate the operation of an embodiment of user location minimizing software 41.

Processing device 40 is connected to persistence storage 42 which stores maps and other information accessed by software 41. In an embodiment, persistence storage 42 is a large capacity disc drive for storing maps, business locations, and other information accessed by software 41. In alternate embodiments, persistence storage 42 includes multiple storage devices. In some embodiments persistence storage 42 may be incorporated into processing device 40.

Figure 2:
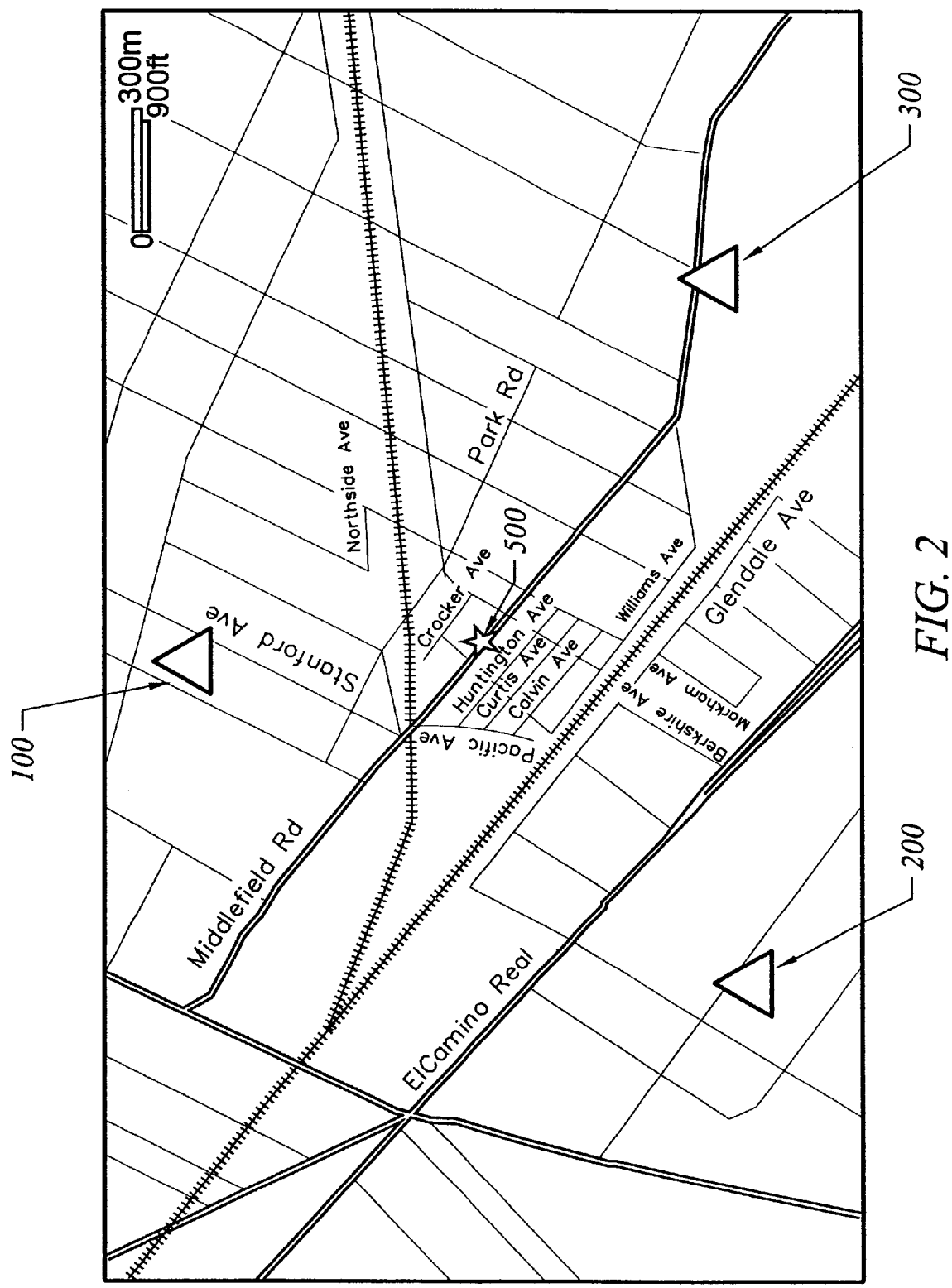
FIGS. 2–3 illustrate a map, according to an embodiment of the present invention; and, FIGS. 4A–4B are flow charts illustrating a user location minimizing software program 41 shown in FIG. 1, according to an embodiment of the present invention.
Figure 3:
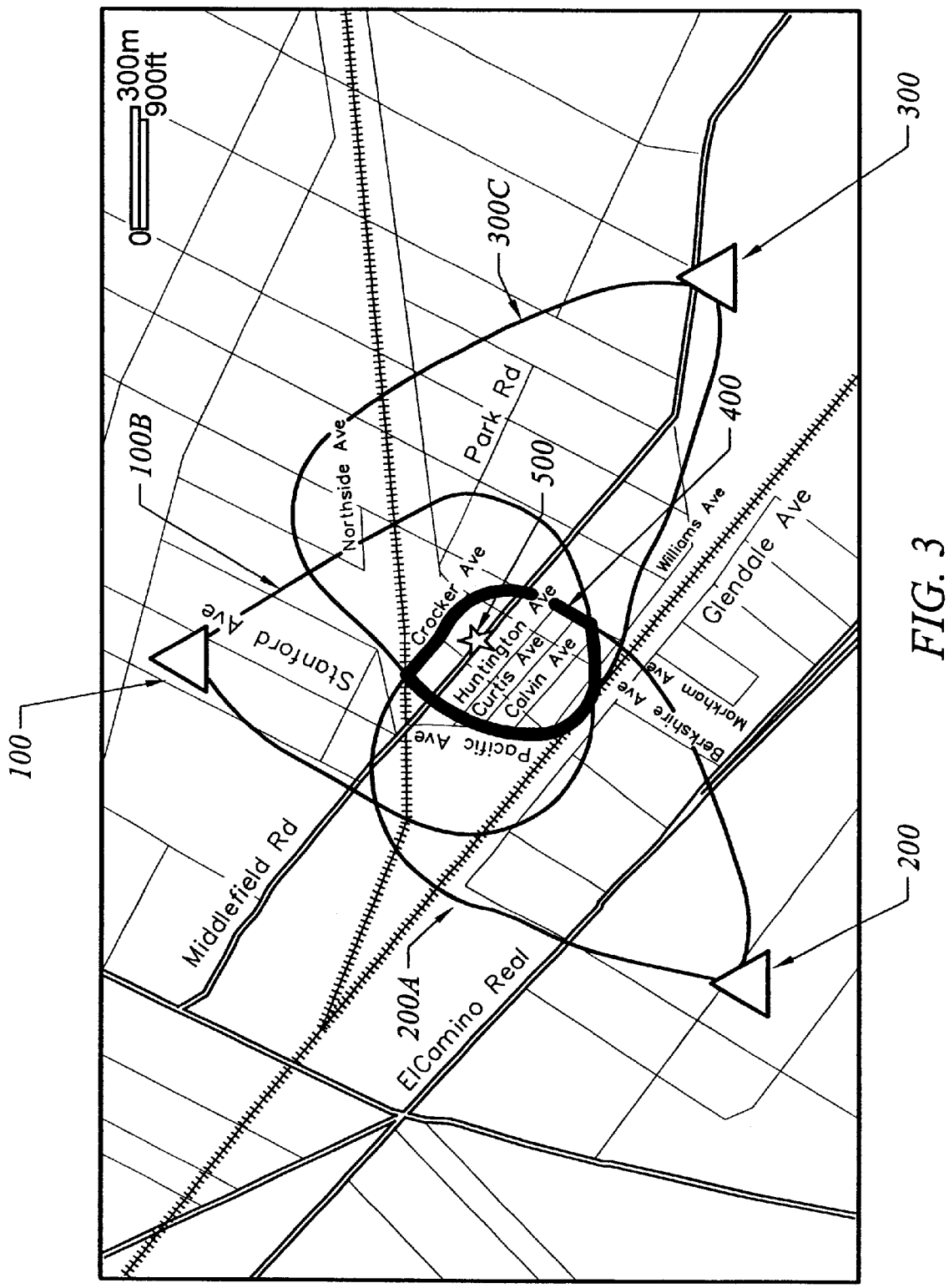

FIGS. 2 and 3 are maps of a typical urban city. For example FIG. 2 illustrates freeways, railroads, parks, local roads, and three cellular towers, 100, 200, and 300. In an embodiment, user 20 may be requesting directions to a desired point of interest beginning from his current location 500. In alternate embodiments, user 20 may need medical or police assistance immediately dispatched to his current location 500, or user 20 may be lost and need some other form of assistance or directions regarding their location 500. In another embodiment, information may be needed regarding the area surrounding user's 20 current location.

FIG. 3 illustrates an embodiment of how an estimated boundary area surrounding user 20, including his current location 500, may be determined using cellular triangulation. FIG. 3 illustrates cellular towers 100, 200 and 300. In addition, footprints of the signal coverage for the south sector of cellular tower 100, north-east sector of cellular tower 200 and north-west sector of cellular tower 300 are displayed as 100B, 200A and 300C, respectively. By use of triangulation, a method know by those of ordinary skill in the art, an estimated boundary area 400 of user's 20 potential location may be determined.

Such triangulation may be done using three separate cellular tower footprints or as many footprints as there are available within a given range. Alternatively, in some embodiments multiple cellular tower footprints may not be available. For example, if user 20 is located in an area that is only covered by one footprint, then the estimated boundary area 400 will be determined based on the estimated coverage area of the sector of the cellular tower that user 20 is currently receiving transmission from.

In some embodiments, estimated boundary area 400 may be reduced based on the signal strength of the cellular channel on which user 20 is currently transmitting. In an embodiment, area 400 may be reduced by having estimates of signal time delays. Additionally, in some embodiments, estimated boundary area 400 may further be reduced based on the signal strength of nearby cellular tower sectors.

In alternate embodiments triangulation may be performed using, among other systems, low earth orbit satellites or global positioning satellites.

FIGS. 4A and 4B is a flow chart of an embodiment of user location minimizing software 41. As one of ordinary skill in the art would appreciate, FIGS. 4A and 4B show logic blocks for performing specific functions. In alternate embodiments, more or less logic blocks may be used. Similarly, logic blocks may represent software programs, software objects, software subroutines, software code fragments, hardware operations, user operations, singly or in combination.

User location minimization method 200 initiates by inputting or receiving a boundary area, as illustrated by logic block 1010. This estimated boundary area is determined by performing one of the above described embodiments of triangulation. For example, the estimated boundary area in FIG. 2 is represented by the enclosed area 400.

A search of database 43 for street names in the estimated boundary area is then performed, as illustrated by logic block 1020. For example, the street names that would result from a search of database 43 using estimated boundary area 400, represented in FIG. 3, would be Crocker Ave., Calvin Ave., Williams Ave., Dumbarton Ave., Berkshire Ave., Middlefield Rd., and $1^{st}$ Ave.

A determination is then made in logic block 1030 whether there are two or more street names returned by the search of database 43 in logic block 1020.

If there are two or more street names present, control passes to logic block 1040. Otherwise control passes to logic block 1100.

In logic block 1100, a second determination is made of whether there is one street name returned by the search of database 43 in logic block 1020.

If there is one street name present, control passes to logic block 1110. Otherwise control passes to logic block 1200.

In logic block 1200, the estimated boundary area is expanded by moving the boundary area out a fixed dimension. For example, boundary area 400, in FIG. 3 may be expanded by doubling each dimension. In an alternate embodiment, the boundary area may be expanded to include a larger portion of the footprint of the sector of the cellular tower user 20 is currently receiving a signal from.

After an expansion of the boundary area in logic block 1200, control passes to logic block 1020 and logic steps may be repeated.

In logic block 1110 the street name returned by the search of the database 43 in logic block 1020 is transmitted to user 20 through the communication transmitter/receiver 30 to the communication device 21. In an embodiment, use of audio technology is used to speak the street name to user 20 through communication device 21. In some embodiments the street name is displayed in text format on the communication device 21.

A determination is made in logic block 1120 whether the street name transmitted to user 20 through communication device 21 is the name of the street on which user 20 is currently located. In an embodiment, this determination is made by user 20 speaking an affirmative or negative response into communication device 21. In an alternate embodiment, this determination is made by user 20 pressing the number 1 on communication device 21 to acknowledge a finding of the name of the street on which user 20 is currently located, or pressing the number 2 on communication device 21 to designate that the name of the street given is not the name of the street on which user 20 is currently located. Alternatively, any combination of buttons on communication device 21 may be used to represent an affirmative or negative answer.

If a negative answer is received, control passes to logic block 1200 and logic steps may be repeated. Otherwise, control is passed to logic block 1070.

In logic block 1040, the street names received from the search of database 43 in logic block 1020 are loaded into a software program for speech recognition, or for text matching.

In logic block 1050 user 20 is requested to input or select the name of the street on which they are currently located. In an embodiment, user 20 is asked to speak the name of the street on which they are currently located.

In another embodiment, user 20 is asked to enter the name, or a portion thereof, of the street that they are currently located on using the keypad on communication device 21. In an alternate embodiment, user 20 may be asked to enter an address.

Alternatively, in some embodiments, user 20 may be presented with a list of the street names that were the result of the search of database 43 in logic block 1020 and requested to select the name of the street on which they are currently located. In this embodiment, the list of names may be presented verbally through communication device 21 or by displaying the names of the streets using an alphanumeric display on communication device 21. In some embodiments, the names of the streets may have a number or some other symbol associated with them that user 20 may either speak or enter by pressing a button on communication device 21 to designate their selection.

In addition, in some embodiments, there is an option for none of the above, designating that none of the street names given to user 20 match the name of the street on which they are currently located.

In still another embodiment, user 20 may be presented with a list of address ranges of a street. For example, Middlefield 500–599, 600–699, 700–799, . . . The list of address ranges may be presented in an order based on the most likely address range being presented first.

A determination is then made in logic block 1060 of whether user 20 is currently located on a street matching the name of a street returned by the search of database 43, performed in logic block 1020. In an embodiment, the verbal response received from user 20, in logic block, 1050 is then compared to the names of the streets loaded into the software program for speech recognition in logic block 1040.

In another embodiment, the textual response received from user 20, in logic block 1050, is then compared with the names of the streets entered into the text matching software in logic block 1040.

If the input received by user 20 matches one of the street names received from the search of database 43 in logic block 1020 control is passed to logic block 1070. Otherwise, control is passed to logic block 1300. For example, if user 20 is currently located at location 500, represented in FIG. 3, user 20 would input or select Middlefield Rd.

In logic block 1300, a determination is made of whether user 20 wishes to repeat the step inputting the name of the street on which they are currently located. In an embodiment, user 20 may have incorrectly spoken or typed the name of the street on which they are currently located, resulting in a negative outcome in logic block 1060 and they may wish to re-enter the name of the street on which they are currently located.

If user 20 desires to re-enter the name of the street, control passes to logic block 1050 and logic steps may be repeated. Otherwise, control passes to logic block 1200 and logic steps may be repeated.

In logic block 1070, the name of the street user 20 is located on has been determined and matched with a name of a street received from the search of database 43 in logic block 1020. Upon receiving a match of the name of the street on which user 20 is currently located control is passed to logic block 2020. In some embodiments, upon finding a match of the street name on which user 20 is currently located the program may exit.

In logic block 2020, a search of database 43 for names of streets within the estimated boundary area 400, that cross the name of the street matched in logic block 1070 is then performed. For example, if the name of the street matched in logic block 1070 is Middlefield Rd., as represented in FIG. 3, a search of database 43 for names of cross-streets located within estimated boundary area 400, would return Dumbarton Ave., Berkshire Ave., and $1_1$ Ave.

A determination is then made in logic block 1030 whether there are two or more street names returned by the search of database 43 in logic block 2020.

If there are two or more street names present, control passes to logic block 1040. Otherwise control passes to logic block 1100.

In logic block 1100, a second determination is made of whether there is one street name returned by the search of database 43 in logic block 2020.

If there is one street name present, control passes to logic block 2110. Otherwise control passes to logic block 2201.

In logic block 2201, user 20 is asked whether they are located near any cross-street. In an embodiment, use of audio technology is used to request feedback from user 20. In some embodiments, user 20 is asked whether they are near a cross-street by displaying the question in text format on communication device 21.

A determination is made in logic block 2202 whether user 20 is currently located near a cross-street. In an embodiment, this determination is made by user 20 speaking an affirmative or negative response into communication device 21. In an alternate embodiment, this determination is made by user 20 pressing the number 1 on communication device 21 to acknowledge that they are near a cross-street, or pressing the number 2 on communication device 21 to designate that there is no cross-street nearby. Alternatively, any combination of buttons on communication device 21 may be used to represent a positive or negative answer.

If positive answer is received, control passes to logic block 2200 and the boundary area is expanded. Otherwise control is passed to logic block 2270.

In logic block 2270, it has been determined that there is no cross-street near user's 20 current location and the program exits.

In logic block 2200, estimated boundary area 400 is expanded by moving the boundary area 400 out a fixed dimension in the direction of the name of the road matched in logic block 2070. For example, if Middlefield Rd. has been determined in logic block 2070 to be the street on which user 20 is currently located, estimated boundary area 400, in FIG. 3, may be expanded to further encompass Middlefield Rd. in both the north-west and south-east directions.

After an expansion of boundary area 400 in logic block 2200, control passes to logic block 2020 and logic steps may be repeated.

In logic block 2110, the cross-street name returned by the search of database 43 in logic block 2020 is transmitted to user 20 through communication transmitter/receiver 30 to communication device 21. In an embodiment, use of audio technology is used to speak the street name to user 20 through communication device 21. In some embodiments, the street name is displayed in text format on communication device 21.

A determination is made in logic block 2120 whether the street name transmitted to user 20 through communication device 21 is the name of the closest cross-street to where user 20 is currently located. In an embodiment, this determination is made by user 20 speaking an affirmative or negative response into communication device 21. In an alternate embodiment, this determination is made by user 20 pressing the number 1 on communication device 21 to acknowledge that this is the nearest cross-street, or pressing the number 2 on communication device 21 to designate that the name of the street given is not the name of the nearest cross-street. Alternatively, any combination of buttons on communication device 21 may be used to represent a positive or negative answer.

If a negative answer is received, control passes to logic block 2201 and logic steps may be repeated. Otherwise, control is passed to logic block 2070.

In logic block 1040, the cross-street names received from the search of database 43 in logic block 2020 are loaded into a software program for speech recognition, or for text matching.

In logic block 2050, user 20 is requested to input or select the name of the cross-street closest to where they are currently located. In an embodiment, user 20 is asked to speak the name of the nearest cross-street.

In another embodiment, user 20 is asked to enter the name, or a portion thereof, of the cross-street nearest to their current location using the keypad on communication device 21.

Alternatively, in some embodiments, user 20 may be presented with a list of cross-street names that were the result of the search of database 43 in logic block 2020 and requested to select the name of the nearest cross-street. In this embodiment, the list of names may be presented verbally through communication device 21 or by displaying the names of the cross-streets using an alpha-numeric display on communication device 21. In some embodiments, the names of the cross-streets may have a number or some other symbol associated with them that user 20 may either speak or enter by pressing a button on communication device 21 to designate their selection.

In addition, in some embodiments, there is an option for none of the above, designating that none of the cross-street names given to user 20 match the name of the cross-street nearest to their current location.

A determination is then made in logic block 1060 of whether user 20 is currently located near a cross-street matching the name of a cross-street returned by the search of database 43 performed in logic block 2020. In an embodiment, the verbal response received from user 20 in logic block 2050 is then compared to the names of the cross-streets loaded into the software program for speech recognition in logic block 1040.

In another embodiment, the textual response received from user 20 in logic block 2050 is then compared with the names of the cross-streets entered into the text matching software in logic block 1040.

If the input received by user 20 matches one of the cross-street names received from the search of database 43 in logic block 2020 control is passed to logic block 2070. Otherwise, control is passed to logic block 1300.

In logic block 1300 a determination is made of whether user 20 wishes to repeat the step inputting the name of the cross-street nearest to their current location. In an embodiment, user 20 may have incorrectly spoken or typed the name of the cross-street nearest to their current location, resulting in a negative outcome in logic block 1060 and they may wish to re-enter the name of the cross-street nearest to their current location.

If user 20 desires to re-enter the name of the cross-street, control passes to logic block 2050 and logic steps may be repeated. Otherwise, control passes to logic block 2201 and logic steps may be repeated.

In logic block 2070, the name of the cross-street nearest user's 20 current location has been determined and matched with a name of a cross-street received from the search of the database 43 in logic block 2020. Upon receiving a match of the name of the cross-street nearest user's 20 current location the program exits.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for identifying a location of an individual, comprising the steps of:
    (a) estimating a first area surrounding the location;
    (b) obtaining a set of street names of a respective set of streets in the area;
    (c) requesting a street name from the individual; and,
    (d) determining the location responsive to a match between the street name from the individual and the set of street names.

2. The method of claim 1, further comprising the step of:
    estimating a second area surrounding the location, wherein the second area is larger than the first area; and,
    repeating steps (b)–(d).

3. The method of claim 1, wherein the set of street names is one street.

4. The method of claim 1, wherein the obtaining step includes loading the set of street names into a voice recognition software.

5. The method of claim 1, wherein the obtaining step includes loading the set of street names into text recognition software.

6. A computer for identifying a location of an individual, comprising:

a storage device for storing a plurality of street names;

a processor coupled to the storage device;

the storage device storing a program for controlling the processor; and the processor operative with the program to:
(a) obtain a first area surrounding the location;
(b) obtain a set of street names of a respective set of streets in the area from the plurality of street names;
(c) request a street name from the individual;
(d) receive a street name from the individual; and
(e) determine the location responsive to a match between the street name received from the individual and the set of street names.

7. A system for identifying a location of an individual, comprising:

a first processing device for obtaining a first area surrounding the location;

a storage device, coupled to the first processing device, for storing a set of street names of a respective set of streets in the area;

a second processing device for requesting a street name from the individual and receiving a street name response;

wherein the first processing device determines the location responsive to a match between the street name from the individual and the set of street names.

8. An article of manufacture, including computer readable medium, comprising:

(a) a first software program for obtaining a first area surrounding an individual at a location;

(b) a second software program for obtaining a set of street names from a respective set of streets in the area;

(c) a third software program for requesting a street name from the individual and receiving a street name response; and, (d) a fourth software program for determining the location responsive to a match between the street name from the individual and the set of street names.

9. The method of claim 1, further including the steps of:

(e) obtaining a second set of street names of a respective set of streets within the area crossing the determined location street;

(f) requesting a second street name from the individual;

(g) receiving a response from the individual; and, (h) determining a cross street responsive to a match between the second street name received from the individual and the second set of street names.

10. The method of claim 9, further comprising the steps of:

estimating a second area surrounding the street name determined in step (d), wherein the second area is larger than the first area; and, repeating steps (e)–(h).

11. The method of claim 9, wherein the step of obtaining a second set of street names includes loading the second set of street names into a voice recognition software program.

12. The method of claim 9, wherein the step of obtaining a second set of street names includes loading the second set of street names into a text recognition software program.

13. The computer of claim 6, wherein the processor is further operative with the program to:

estimate a second area surrounding the location, wherein the second area is larger than the first area; and, repeat steps (b)–(e).

14. The computer of claim 6, wherein the processor is further operative with the program to:

(f) obtain a second set of street names of a respective set of streets within the area crossing the street named received from the individual;

(g) request a second street name from the individual;

(h) receive a second street name from the individual; and, (i) determine a cross street responsive to a match between the second street name received from the individual and the second set of street names.

15. The computer of claim 14, wherein the processor is further operative with the program to:

estimate a second area surrounding the street name received in step (d), wherein the second area is larger than the first area; and, repeat steps (f)–(i).

16. The article of manufacture of claim 8, further comprising:

a fifth software program for estimating a second area surrounding the location, wherein the second area is larger than the first area.

17. The article of manufacture of claim 8, further comprising:

(f) a sixth software program for obtaining a second set of street names of a respective set of streets within the area crossing the street name received from the individual;

(g) a seventh software program for requesting a second street name from the individual;

(h) an eighth software program for receiving a response from the individual; and, (i) a ninth software program for determining a cross street responsive to a match between the second street name received from the individual and the second set of street names.

18. The article of manufacture of claim 17, further comprising:

a tenth software program for estimating a second area surrounding the street name received by the third software program, wherein the second area is larger than the first area; and, an eleventh software program for re-executing software programs eight through eleven.

19. The article of manufacture of claim 17, further comprising:

a twelfth software program for loading the second set of street names into a voice recognition software program.

20. The article of manufacture of claim 17, further comprising:

a thirteenth software program for loading the second set of street names into a text recognition software program.

* * * * *